Nov. 2, 1954

G. W. COCKS 2,693,286

CARGO HANDLING APPARATUS FOR VEHICLES

Filed Feb. 6, 1952

INVENTOR
GEORGE W. COCKS, DECEASED, BY
GERTRUDE EVA M. COCKS, EXECUTRIX
BY Harold I Kaplan
ATTORNEY Nov. 2, 1954 G. W. COCKS 2,693,286
CARGO HANDLING APPARATUS FOR VEHICLES
Filed Feb. 6, 1952 3 Sheets-Sheet 2
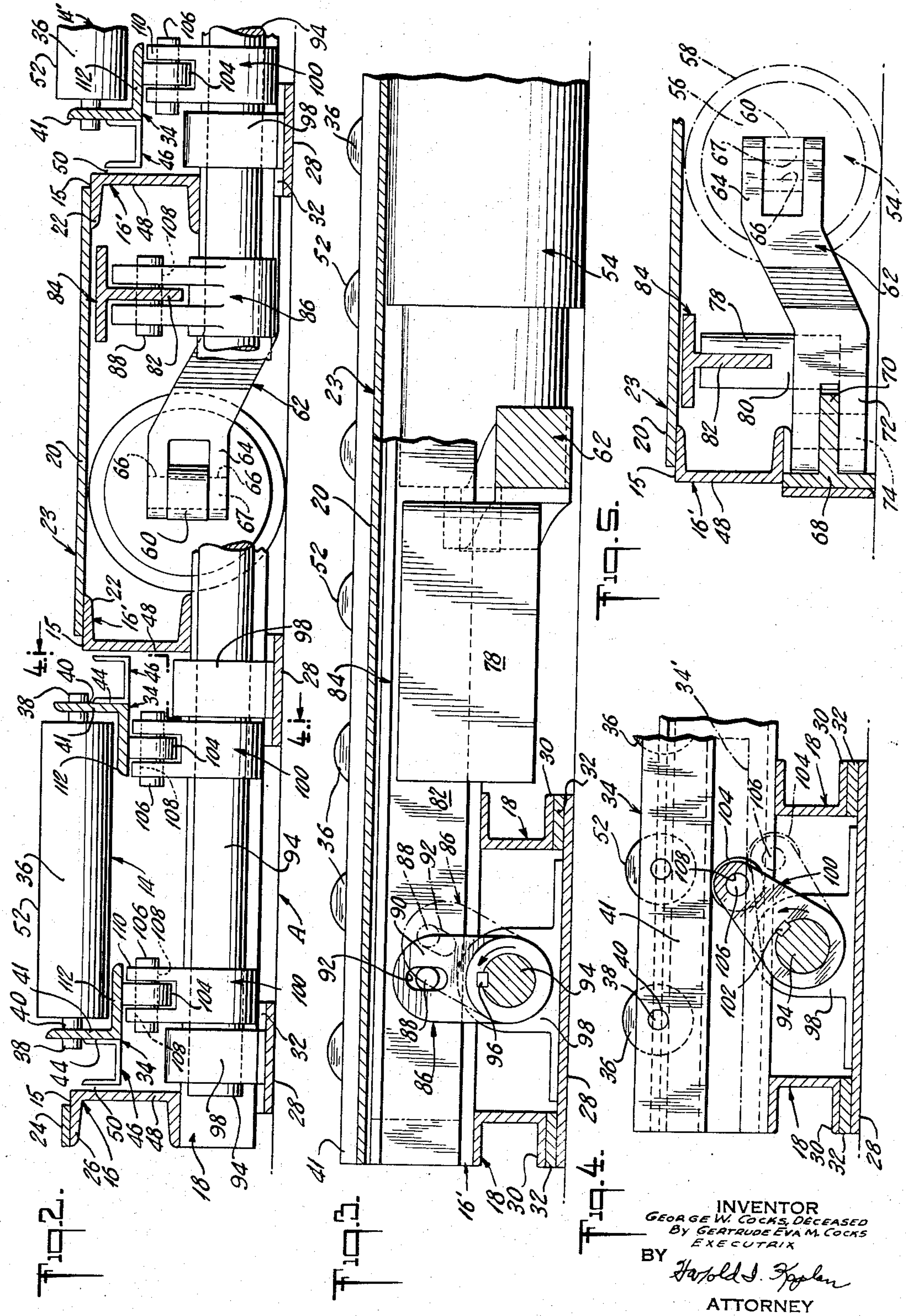

CARGO HANDLING APPARATUS FOR VEHICLES
Filed Feb. 6, 1952 3 Sheets-Sheet 3
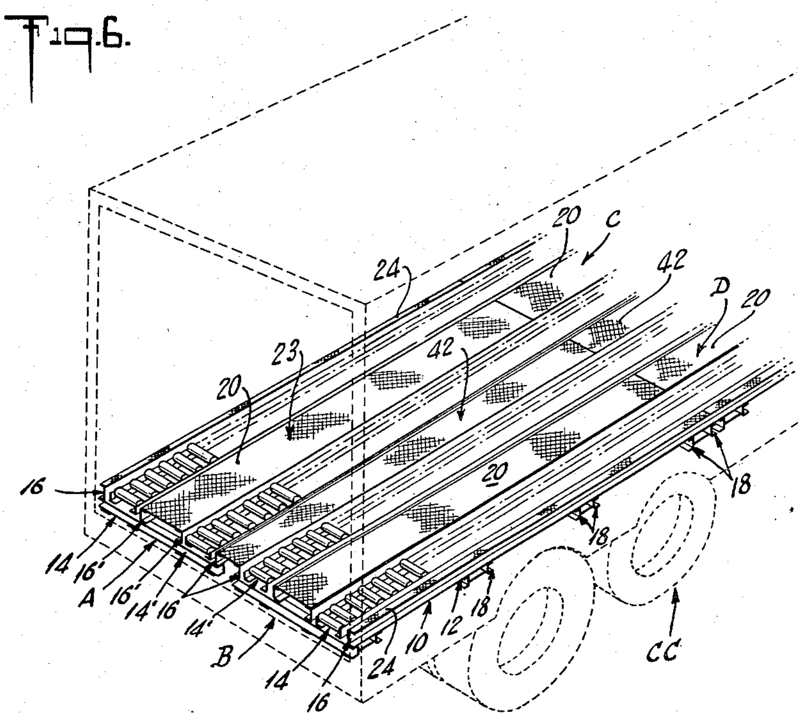
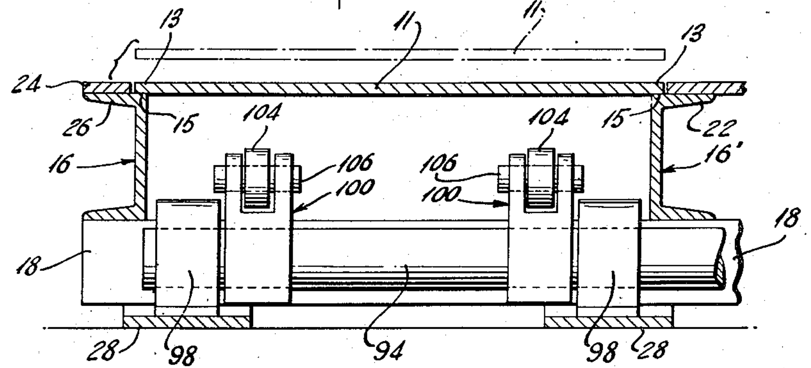
INVENTOR
GEORGE W. COCKS, DECEASED BY
GERTRUDE EVA M. COCKS, EXECUTRIX
BY Harold I. Kaplan
ATTORNEY United States Patent Office 2,693,286

Patented Nov. 2, 1954

2,693,286

CARGO HANDLING APPARATUS FOR VEHICLES

George W. Cocks, deceased, late of Brielle, N. J., by Gertrude Eva M. Cocks, executrix, Brielle, N. J.

Application February 6, 1952, Serial No. 270,215

8 Claims. (Cl. 214—84)

This invention relates generally to improvements in cargo handling apparatus and more particularly to improvements in cargo handling apparatus adapted for transporting palletized loads.

One object of the present invention is the provision of improved cargo handling apparatus having a degree of flexibility and efficiency substantially greater than the heretofore used conventional cargo handling apparatus whereby palletized loads and unit cargo loads may be transported more economically and in less time.

Another object of the present invention is the provision of improved cargo handling apparatus which can be installed in any conventional cargo carrier without modification of the latter and which can be readily integrated as a basic component of a cargo carrier at the time of its initial fabrication.

Another object of the present invention is the provision of improved cargo handling apparatus adapted to be used with conventional cargo carriers which has a provision whereby palletized loads or unit cargo loads may be loaded and positioned on such apparatus with a minimum of frictional resistance and after such positioning the load will remain securely in place for transit.

Another object of the present invention is the provision of improved cargo handling apparatus which can be installed in any conventional cargo carrier and which has means for elevating a load supported thereon and to facilitate the movement of such load in the carrier, said means being readily removable from the apparatus whereupon a replacement plate may be positioned relative to the apparatus to impart to the latter conventional cargo supporting characteristics. More particularly, the improved cargo handling apparatus is provided with elevatable floating roller bed sections which may be readily removed and replaced with supporting plates, if desired, whereby such apparatus will have a flat continuous supporting surfase as in conventional cargo carriers. The aforementioned floating roller bed sections may be operatively positioned relative to the apparatus for loading and unloading purposes and thereafter removed whereby sets of floating sections are only needed at the points of loading and unloading of the cargo carriers, thus requiring but a minimum number of sets of floating sections to service a large number of cargo carriers equipped with such apparatus.

Yet another object of the present invention is the provision of generally improved cargo handling apparatus which is economical to manufacture and maintain, light in weight, and which is of extremely simple, rugged, and compact construction.

Other objects, features, and advantages of the present invention will become apparent as the description thereof proceeds when considered in connection with the accompanying illustrative drawings, in which:

Figure 2 is a sectional view on an enlarged scale taken on the line 2—2 of Figure 1;

Figure 3 is a sectional view on an enlarged scale taken on the line 3—3 of Figure 1;

Figure 4 is a sectional view taken on the line 4—4 of Figure 2;

Figure 5 is a sectional view on an enlarged scale taken on the line 5—5 of Figure 1;

Figure 6 is a fragmentary perspective view of the cargo handling apparatus installed in a cargo carrier; and Figure 7 is a view of a portion of Figure 2 showing the floating section removed and a replacement supporting plate positioned relative to the apparatus.

Figure 1:
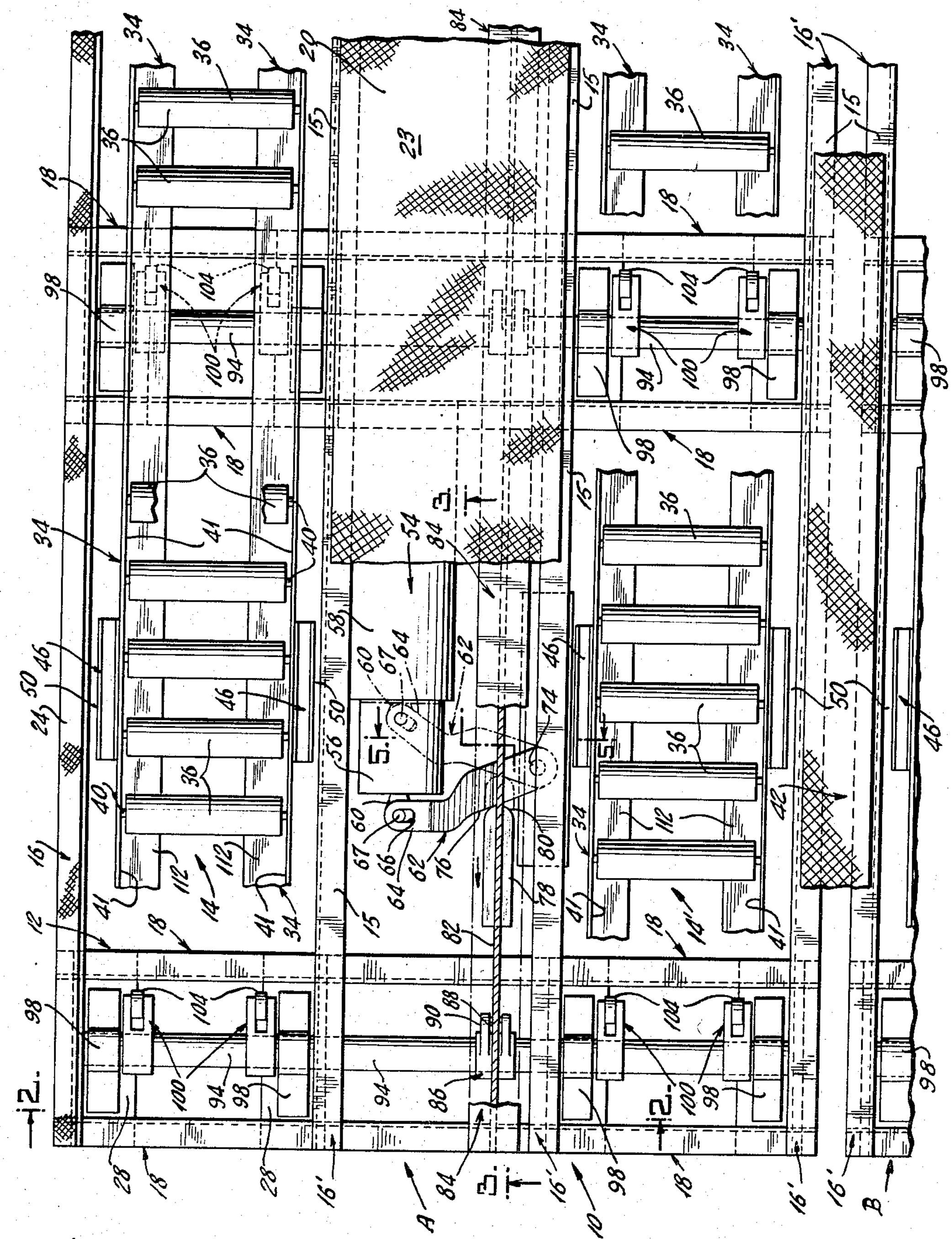
Figure 1 is a fragmentary top plan view of the cargo handling apparatus according to the present invention with parts broken away to reveal structural details and with the floating sections shown in raised position.

Referring now to the drawings, and more particularly to Figs. 1 and 6 thereof, the cargo handling apparatus 10, which may be formed in sections, comprises a main structural frame 12 and an associated series of floating roller bed sections 14 which are removably mounted in said frame in a manner and for a purpose to be described in detail below. The main structural frame 12 may take any desired form and be of any desired size and in the illustrative example such frame is composed of a series of spaced longitudinal channel members 16 and a series of spaced transverse channel members 18, which are secured to each other in any conventional manner, for example, by welding, riveting or bolting.

Extending across the intermediate channel members $16^1$ at each section is a longitudinally extending floor plate 20 which is secured to the upper legs 22 of members $16^1$ in any suitable manner. A floor plate 20 will extend between each pair of members $16^1$, not having a bed section 14 therebetween, of each section to form part of a supporting floor 23 for palletized or unit cargo loads. The floor 23 will also include the end supporting strips 24 which are secured to the end members 16 at its upper leg 26; the strips 24 and plates 20 being in horizontal alignment as best shown in Figure 2.

Extending between associated pairs of transverse members 18 are base members 28 which are suitably secured to the base legs 30 of members 18 through the intermediation of elements 32 (see Figs. 3 and 4), said members 28 forming the base of the apparatus and being adapted to be positioned on the floor of cargo carrier CC as shown in Fig. 6. The floor 23, comprising the strips 24 and floor plates 20, may be formed of any suitable material, and in the preferred embodiment said floor is formed of diamond plates to increase the friction between the floor and the cargo being supported thereon.

Positioned between associated pairs of channel members 16 is a floating roller bed section 14 comprising longitudinal support members 34 having rotatably mounted thereto a series of longituidnally spaced transversely extending rollers 36 (see Figs. 1 and 2). More particularly, each roller 36 is provided with a pair of centrally positioned axially extending shafts 38 which are adapted to be received in complementary apertures 40 in the members 34. Thus, the rollers 36 are uniformly spaced longitudinally of the channel members 34 and for this purpose the latter are provided with spaced longitudinally aligned apertures 40 in the vertical legs 41 with associated pairs of apertures 40 being in transverse alignment for the reception of the complementary shafts 38 of its associated roller 36.

With reference to Figure 1, it will be noted that the rollers 36 in bed section 14 are staggered from the rollers 36 of the adjacent bed section $14^1$, for the purpose of obtaining a more even distribution of the load being supported by said rollers when the latter are operatively associated with said load.

For convenience in manufacturing and assembly, the apparatus may be fabricated in sections, for example, sections A, B, C, and D as shown in Figure 6 with each section comprising a pair of floating roller bed sections 14 and adjacent side by side sections, for example, sections A and B being joined by a connecting longitudinal floor plate 42 which is formed similar to floor plates 20 and is horizontally aligned therewith to complete the formation of supporting floor 23. The installation shown in Fig. 6 also includes the sections C and D which are longitudinally aligned with sections A and B, respectively and are similarly joined.

It will be evident from the above that each section A, B, C and D may be of a uniform size and the sections may be assembled in any desired manner to have a supporting surface coextensive with the floor of the cargo carrier CC on which the apparatus is mounted.

Thus, by way of example, if the cargo carrier CC has a floor 27 feet long and the sections are standardized in 10 foot lengths, said carrier will require two standardized sections and one "special" section of 7 foot length to span the floor length, it being understood that the width of the sections will be selected to span the width of the floor of the carrier in assembled relationship.

Thus, as far as practicable each installation will comprise a plurality of assembled standard sections A, B, C and D, although it is to be understood that each section may be of any desired size and may be assembled to a complementary section in any desired manner.

In order to properly position each bed section 14 relative to its adjacent channel members 16, each support member 34 has secured on the outer face 44 of its vertical leg 41, a longitudinal channel 46 which extends for the length of the section.

It will be understood that the channels 46 are so dimensioned as to permit its associated bed section to be longitudinally reciprocated, relative to the adjacent inner faces 48 of associated channel members 16, with a small amount of clearance 50, for a purpose to be described hereinafter. Each bed section is removably supported in the frame 12 of the apparatus in a manner to be described in detail hereinafter.

Each bed section 14 of an installation is adapted to be reciprocated in unison between a raised position in which the outer periphery 52 of the rollers 36 will extend above the surface of the supporting floor 23 and a lowered position in which the outer periphery 52 of the rollers 36 will be positioned below the surface of the floor 23.

In Figs. 2, 3 and 4 the rollers 36 are shown in their raised position in solid lines and in Fig. 4, the broken lines 34[1] represent the position of members 34 in their lowered position. It is to be understood that any preselected range of reciprocation between spaced vertical positions of the bed sections may be used as desired and it is within the scope of this invention to have the raised and lowered positions of the bed sections at any desired vertical point relative to the floor 23.

Any conventional means may be utilized to effect the reciprocation of the floating bed sections 14, such as mechanical, hydraulic, or electrical means. In the illustrative example the means to reciprocate the floating sections 14 is positioned within the confines of the frame 12 and comprises a hydraulic motor or actuator 54 having a piston 56 which is adapted to be longitudinally reciprocated in response to the admission of fluid in the cylinder 58.

The cylinder or casing 58 of motor 54 is secured relative to the frame 12 in any desired manner and the piston 56 is adapted to be reciprocated from its retracted position, shown in broken lines in Fig. 1, in which the floating bed sections are in their lowermost position, to its fully extended position shown in solid lines and in which the floating bed sections are in their uppermost or raised position.

Secured to the piston 56 is a suitable fitting 60, which is pivotally mounted to the yoke 62. More particularly, the yoke 62 has a forked end 64 in which is positioned the fitting 60, the forked end 64 having elongated slots 66 for the reception of floating pivot pin 67, which also extends through the fitting 60 as shown in Figs. 1, 2 and 5.

The yoke 62 is pivotally mounted to the frame 12 in any suitable manner and as shown in the drawings, by way of example, T-bar 68, which is secured to the frame 12, has a portion of its horizontal leg 70 straddled by the forked end 72 of yoke 62 with a pivot pin 74 passing through registered apertures in the leg 70 and forked end 72 of yoke 62.

Cooperatively associated with cam edge 76 of yoke 62 is follower element 78 having an arcuate edge 80 which is adapted to cooperate with cam edge 76. The follower element 78 straddles and is secured to the depending leg 82 of the longitudinally extending T-actuating member 84 in any conventional manner, as by bolting, riveting, welding and the like. The T-member 84 is the main actuating member of the apparatus and extends for substantially the full length of the sections comprising the particular installation.

At longitudinally spaced points along T-member 84, are master links 86 (see Fig. 3) which are pivotally mounted to the depending leg 82 by means of the floating pivot pins 88.

Thus, the master links 86 have a forked end 90 which straddles leg 82, the forked end 90 having aligned elongated slots 92 for the reception of a floating pivot pin 88 which also extends through leg 82 and is suitably secured thereto.

Each master link 86 is keyed to a transverse actuating shaft 94 by means of key element 96, and each transverse actuating shaft is mounted for rotation in its associated spaced bearing blocks 98, which are secured to base members 28.

Secured to each actuating shaft 94 at spaced intervals are lifting brackets 100, said brackets being keyed to shaft 94 by means of keys 102 (see Fig. 4).

Rotatably mounted on an end portion of brackets 100 are lifting rollers 104, said rollers having a shaft 106 extending therethrough, which shaft is adapted to be received in registered apertures 108 at the forked end 110 of brackets 100.

As best shown in Fig. 2, each bracket 100 and its associated lifting roller 104 are spaced so that each lifting roller will cooperate with a horizontal leg 112 of its associated support member 34 to support the floating bed sections relative to the apparatus.

Thus, each shaft 94 is provided with lifting rollers 104 for each of the support members 34 and any number of shafts 94 may be associated with T-member 84 at spaced longitudinal points to support and vertically reciprocate the floating bed sections in the installation, as will be readily apparent.

The hydraulic motor 54 may be actuated from any suitable pressure fluid source and to reciprocate the floating bed sections 14 from their lowered position, indicated by broken lines in Fig. 4, to their raised position shown in solid lines in the drawings, the hydraulic motor 54 will be actuated so that piston 56 will be extended as shown in Fig. 1.

The extension of piston 56 will be effective to pivot yoke 62 whereby the cam edge 76 will coact with arcuate edge 80 of follower element 78 to reciprocate T-member 84 in the direction of the arrow shown in Fig. 1. The reciprocation of member 84 will in turn be effective to rotate each of the shafts 94 in the direction of the arrow shown in Fig. 4 whereby each lifting roller 104 will coact with its associated support member 34 to reciprocate the floating bed sections 14 to the raised position.

Each section 14 will be actuated in unison, although if desired one or more sections can be arranged for independent operation. In the lowering cycle of the floating bed sections 14, the reverse of the above takes place, which will be aided by the gravity of any cargo that may be supported on the rollers 36, and by the gravity of the sections 14.

In the operation of the installation, the floating bed sections 14 may be raised to its uppermost position to facilitate the loading and unloading of cargo from the carrier CC whereby the cargo will be supported by the rollers 36 to provide extreme ease for, and a minimum of frictional resistance to, the movement of such cargo on the carrier.

After the cargo has been properly positioned on the supporting floor 23, the rollers 36 may be lowered whereby the cargo will be supported by the diamond plate surface of the supporting floor 23 so that the cargo will remain securely in place in transit.

As will be evident from the above, the apparatus 10 of the present invention is eminently suitable for use with palletized or unit cargo loads in which the base of the pallet or unit cargo shipments will cooperate with the rollers 36 of the floating bed sections 14 to provide cargo handling apparatus having an unusual degree of flexibility and efficiency.

Thus, the above apparatus permits the transporting of cargo in less time and more economically.

It is to be understood that any number and spacing of floating bed sections 14 may be used in a cargo handling installation and if desired the floating bed sections may be fixed to the main structural frame 12. The apparatus is preferably fabricated utilizing aluminum and its alloys and similar light weight metals, having the requisite structural strength, to a maximum to keep the weight of the apparatus at the very minimum. Although the apparatus has been described as structurally separate from the cargo carrier CC, it will be readily apparent that such apparatus can be integrated as a basic component of a cargo carrier at the time of its fabrication, which will reduce the weight addition due to the apparatus.

As pointed out above the floating bed sections may be readily removed from the apparatus when not supporting a load by sliding the sections out of the apparatus. Thus, for loading and unloading purposes, the floating bed sections will be operatively positioned relative to the apparatus and after the sections are lowered and the cargo is being supported by the floor 23, the sections may be removed whereby sets of floating sections are only needed at the points of loading and unloading of the cargo carriers, thus requiring but a minimum number of sets of floating roller sections 14 to service a large number of cargo carriers.

If at any time, it is desired to temporarily convert the apparatus for conventional cargo supporting and transporting, it is only necessary to remove the floating sections 14 and replace them with longitudinal supporting plates 11 as shown in Figure 7.

Thus, the removable supporting plates 11, which may be formed of diamond plate, will have its side edge portions 13 supported by upper face portions 15 of the associated pairs of channel members 16, with said plates 11 being horizontally aligned with floor plates 20 and strips 24 to form part of the supporting floor 23.

Thus, with plates 11 replacing the floating roller bed sections 14, the apparatus will have a flat continuous supporting surface or floor 23, as in conventional cargo carriers, coextensive with the cargo supporting area of the carrier.

It will be evident that the supporting plates 11 may be quickly and easily removed and replaced with floating bed sections to convert the cargo carrier for operation with the benefits of the vertically reciprocable roller bed feature.

The above described improved cargo handling apparatus is relatively inexpensive to manufacture, light in weight, and is of simple, rugged and compact construction.

While there is shown and described herein certain specific structure embodying the invention, it will be manifest to those skilled in the art that various modifications and rearrangements of the parts may be made without departing from the spirit or scope of the underlying inventive concept and that the same is not limited to the particular form herein shown and described except insofar as indicated by the scope of the appended claims.

Having thus described the invention what is claimed is:

1. Cargo handling apparatus comprising a frame structure having a base and a supporting floor, said base and supporting floor lying in spaced horizontal planes, said frame having a plurality of laterally spaced longitudinal frame members adapted to support said floor, a roller bed section supported relative to said frame between an associated pair of longitudinal frame members and between longitudinal portions of said supporting floor, said roller bed section comprising a pair of laterally spaced support members and a plurality of transversely disposed rollers, said rollers being uniformly spaced longitudinally of said support members and aligned to form a row of rollers, said rollers being mounted for rotary movement in the same plane in said support members, said roller bed section being reciprocable between a first position in which said rollers are disposed below said supporting floor and a second position vertically spaced from said first position and in which said rollers project above said supporting floor, and means for reciprocating said rollers between said first and second positions, said means being positioned between said base and supporting floor and having lifting elements which are effective to support said roller bed section relative to said frame in the assembled condition of said roller bed section to said frame.

2. Cargo handling apparatus comprising a frame structure having a base and a supporting floor, said base and supporting floor lying in spaced horizontal planes, said frame having a plurality of laterally spaced longitudinal frame members adapted to support said floor, a roller bed section supported relative to said frame between an associated pair of longitudinal frame members and between longitudinal portions of said supporting floor, said roller bed section comprising a pair of laterally spaced support members and a plurality of transversely disposed rollers, said rollers being uniformly spaced longitudinally of said support members and aligned to form a row of rollers, said rollers being mounted for rotary movement in the same plane in said support members, said roller bed section being reciprocable between a first position in which said rollers are disposed below said supporting floor and a second position vertically spaced from said first position and in which said rollers project above said supporting floor, and means for reciprocating said rollers between said first and second positions, said roller bed section being removably mounted relative to said frame structure and replaceable with supporting plates which are adapted to be positioned between said associated pair of longitudinal frame members and said longitudinal portions of said supporting floor.

3. Cargo handling apparatus comprising a section of frame structure having a base and a supporting floor, said base and supporting floor lying in spaced horizontal planes, said frame having a plurality of laterally spaced longitudinal frame members adapted to support said floor, at least a pair of roller bed sections supported relative to said frame structure between associated pairs of longitudinal frame members and between longitudinal portions of said supporting floor, said pair of roller bed sections being spaced apart by an intermediate longitudinal portion of said supporting floor and its associated longitudinal frame members, each of said roller bed sections comprising a pair of laterally spaced support members and a plurality of transversely disposed rollers, said rollers being uniformly spaced longitudinally of its associated pair of support members and aligned to form a row of rollers, said rollers being mounted for rotary movement in the same plane in said associated pair of support members, the rollers of each bed section being staggered relative to the rollers of its adjacent bed section transversely of said frame structure, said roller bed sections being reciprocable in unison between spaced vertical positions relative to said supporting floor, and means for reciprocating said roller bed sections in unison between said spaced vertical positions.

4. Cargo handling apparatus adapted to be positioned on the cargo supporting surface of a cargo carrier for supporting a load of cargo thereon comprising a frame structure having a base and a supporting floor, said base and supporting floor lying in spaced horizontal planes, said frame structure having a plurality of laterally spaced longitudinal frame members adapted to support said floor, the latter being adapted to support said load of cargo thereon, said base being adapted to be positioned on said cargo supporting surface, a roller bed section supported relative to said frame structure between an associated pair of longitudinal frame members and between longitudinal portions of said supporting floor, said roller bed section comprising a pair of laterally spaced support members and a plurality of transversely disposed rollers mounted for rotation thereon, said roller bed section being reciprocable between a first position in which said rollers are disposed below said supporting floor whereby said load of cargo is supported by said floor and a second position vertically spaced above said first position and in which said rollers project above said supporting floor whereby said load of cargo is supported by said rollers, and means for reciprocating said roller bed section between said first and second positions.

5. Cargo handling apparatus adapted to be positioned on the cargo supporting surface of a cargo carrier, comprising frame structure having a base adapted to be positioned on said cargo supporting surface and a supporting floor spaced from said base, a roller bed section supported relative to said frame structure and comprising a pair of laterally spaced supporting members and a plurality of transversely disposed rollers, said rollers being mounted for rotary movement in their associated supporting members, said roller bed section being reciprocable between spaced vertical positions relative to said supporting floor, and means providing for the longitudinal movement of said roller bed section relative to said frame structure whereby to provide for the removable mounting of said section relative to said frame structure.

6. Cargo handling apparatus of the character described adapted for mounting on the cargo supporting surface of a cargo carrier for supporting a load of cargo thereon, comprising a frame structure having a base and a supporting floor lying in vertically spaced horizontally disposed planes, said frame structure having a plurality of frame members adapted to support said floor, the latter being adapted to support said load of cargo thereon, said base being adapted to be positioned on said cargo supporting surface, a roller bed section supported relative to said frame structure between adjacent portions of said supporting floor, said roller bed section comprising a plurality of transversely disposed rollers mounted for rotation in an associated supporting frame, said roller bed section being reciprocable between a first position in which said rollers are disposed below said supporting floor whereby said load of cargo is supported by said floor and a second position vertically spaced above said first position and in which said rollers project above said supporting floor whereby said load of cargo is supported by said rollers, and means for reciprocating said roller bed section between said first and second positions.

7. Cargo handling apparatus of the character described adapted for mounting on the cargo supporting surface of a cargo carrier for supporting a load of cargo thereon, comprising a frame structure having a base and a supporting floor lying in vertically spaced horizontally disposed planes, said frame structure having a plurality of frame members adapted to support said floor, the latter being adapted to support said load of cargo thereon, said base being adapted to be positioned on said cargo supporting surface, a roller bed section supported relative to said frame structure between adjacent portions of said supporting floor, said roller bed section comprising a plurality of transversely disposed rollers mounted for rotation in an associated supporting frame, said roller bed section being reciprocable between a first position in which said rollers are disposed below said supporting floor whereby said load of cargo is supported by said floor and a second position vertically spaced above said first position and in which said rollers project above said supporting floor whereby said load of cargo is supported by said rollers, power means for reciprocating said roller bed section between said first and second positions, said power means being disposed within the confines of said frame structure.

8. Cargo handling apparatus of the character described adapted for mounting on the cargo supporting surface of a cargo carrier for supporting a load of cargo thereon, comprising a frame structure having a base and a supporting floor lying in vertically spaced horizontally disposed planes, said frame structure having a plurality of frame members adapted to support said floor, the latter being adapted to support said load of cargo thereon, said base being adapted to be positioned on said cargo supporting surface, a roller bed section supported relative to said frame structure between adjacent portions of said supporting floor, said roller bed section comprising a plurality of transversely disposed rollers mounted for rotation in an associated supporting frame, said roller bed section being reciprocable between a first position in which said rollers are disposed below said supporting floor whereby said load of cargo is supported by said floor and a second position vertically spaced above said first position and in which said rollers project above said supporting floor whereby said load of cargo is supported by said rollers, means for reciprocating said roller bed section between said first and second positions, and means providing for the removable mounting of said roller bed section relative to said frame structure.

References Cited in the file of this patent

UNITED STATES PATENTS

| Number | Name | Date |
|---|---|---|
| 703,990 | Burton | July 8, 1902 |
| 1,349,450 | French | Aug. 10, 1920 |
| 1,658,770 | Murray et al. | Feb. 7, 1928 |
| 2,021,503 | Fildes | Nov. 19, 1935 |
| 2,176,636 | Meacham | Oct. 17, 1939 |
| 2,179,047 | McMurry | Nov. 7, 1939 |
| 2,411,133 | Hill | Nov. 12, 1946 |
| 2,459,045 | Pride | Jan. 11, 1949 |
| 2,524,664 | Henderson et al. | Oct. 3, 1950 |
| 2,534,057 | Pride | Dec. 12, 1950 |
| 2,567,335 | Hebert | Sept. 11, 1951 |